Patented July 21, 1942

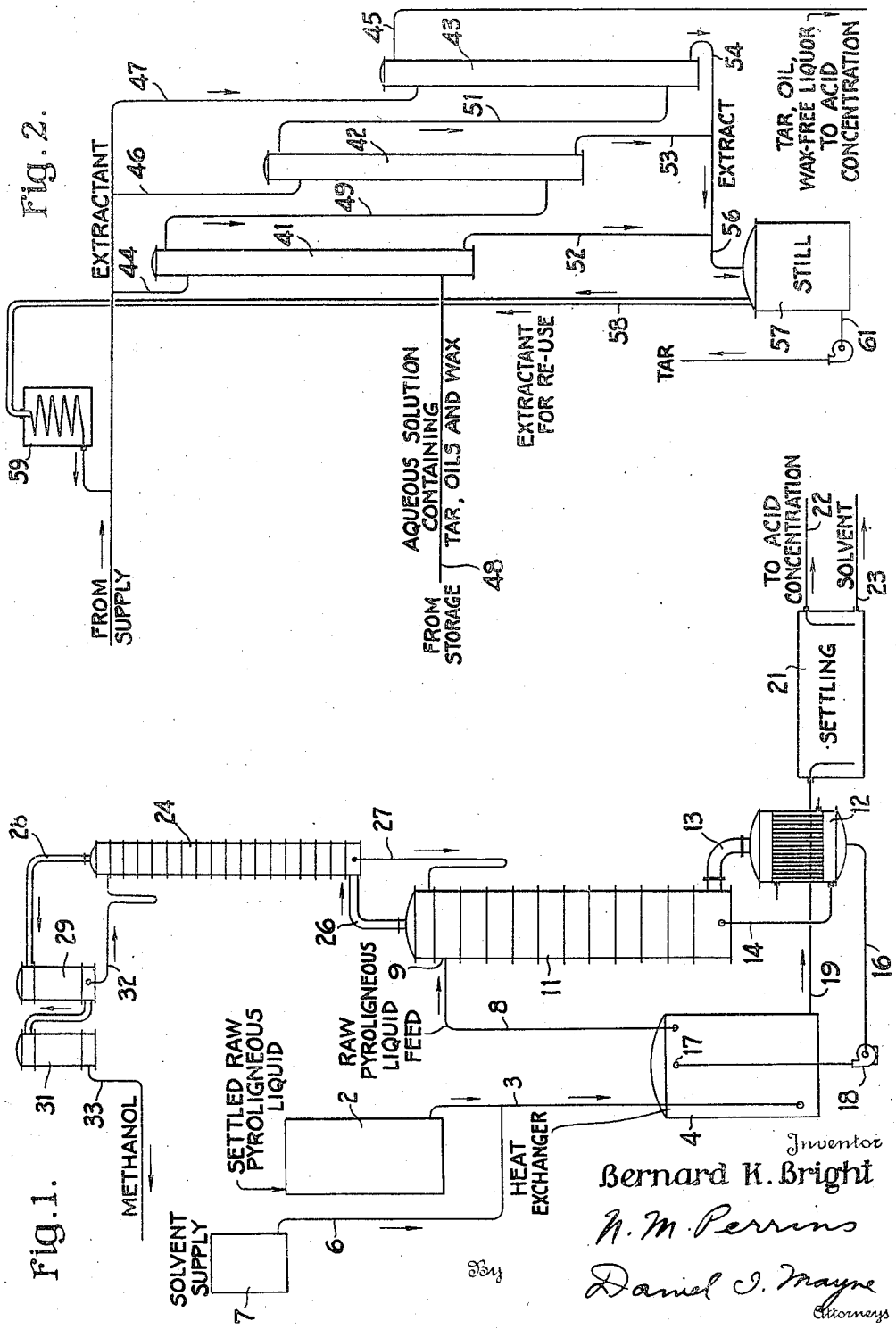

2,290,157

UNITED STATES PATENT OFFICE 2,290,157

TREATMENT AND DISTILLATION OF PYROLIGNEOUS LIQUOR

Bernard K. Bright, Kingsport, Tenn., assignor to Eastman Kodak Company, Rochester, N. Y., a corporation of New Jersey Application May 11, 1939, Serial No. 273,068

5 Claims. (Cl. 202—56)

This invention relates to the treatment of crude pyroligneous liquor for eliminating soluble tars and other detrimental impurities and more particularly to the treatment and distillation of such crude pyroligneous liquor for obtaining a relatively high-grade concentrated acetic acid therefrom.

The production of crude pyroligneous liquor is well-known. It is also known that such crude pyroligneous liquor contains numerous constituents which are detrimental to the production of a water-white acetic acid therefrom. Certain of these impurities which present considerable trouble, are the dissolved soluble tars, oils and waxes which may not be removed from the pyroligneous liquor by settling or other conventional mechanical treatment. If such soluble tars are permitted to remain in the pyroligneous liquor upon subsequent heating and processing thereof discoloration and other effects are produced in the finished acetic acid finally obtained.

I have found a method which is relatively simple and economical, for treating pyroligneous liquor, which may be applied prior to and during the processing thereof to obtain a relatively high-grade acetic acid from the crude starting materials.

This invention has for one object to provide a process for treating crude pyroligneous liquor for the elimination of various tars, oils and waxes which, if not eliminated, would contaminate the acetic acid finally produced. Another object is to provide a solvent method for eliminating the aforementioned detrimental constituents. Still another object is to provide a process of treating crude pyroligneous liquor followed by the distillation thereof.

A still further object is to provide a complete and novel process for the recovery of acetic acid content of pyroligneous liquor. A still further object is to provide novel apparatus arrangements for carrying out my processes aforementioned.

Other objects will appear hereinafter.

I have found that crude pyroligneous liquor, preferably after being treated to remove tars and other impurities which will settle out, may be further treated by contact with certain solvents, preferably under certain conditions of heat recovery to free the pyroligneous liquor from soluble tars, oils and waxes which have heretofore presented considerable problem in the processing of pyroligneous liquor. I have found that the treated pyroligneous liquor may be still further treated by distillation and other steps for eliminating methyl alcohol and finally obtaining, if desired, an anhydrous acetic acid therefrom. In order to render my process exceptionally economical, I have found that the tars and other impurities eliminated may be water extracted at low cost for preventing the loss of any acetic acid therein.

For a more complete understanding of my invention, reference is made to the attached drawing forming a part of the present application.

Fig. 1 is a semi-diagrammatic side elevation view of apparatus arrangement representing one set-up which might be employed for carrying out my invention;

Fig. 2 is another side elevation view showing in some detail an arrangement of apparatus which might be employed particularly for the detarring step.

Referring to Fig. 1, 2 represents a feed tank for settled pyroligneous liquor. This tank is connected by means of conduit 3 to a heat exchanger construction 4 the function of which will be apparent as the description proceeds. Also feeding to feed heat exchanger 4 is another conduit 6 which is connected to a supply reservoir 7 containing the solvent or extractant to be employed for eliminating tars.

The heat exchanger 4 is also provided with an outlet conduit 8 which leads to the upper part 9 of a distillation column 11. This column may be of bubble plate construction and be provided with a heating means such as a calandria 12 which is connected to the column by conduits 13 and 14. The calandria is also connected by means of conduit 16 to the aforementioned heat exchanger as at 17, suitable pumps being provided, for example, as at 18. By this arrangement the hot detarred pyroligneous liquor may be passed into the heat exchanger 4, thereby economizing on heat and at the same time cooling the materials to a desired temperature.

The heat exchanger is in turn connected by means of conduit 19 to a settling unit 21. This unit is provided with a draw-off 22 for the treated acetic acid and another draw-off 23 for the solvent.

Referring again to the column 11, the construction associated with the upper portion thereof is somewhat of a special nature and comprises a second and smaller column 24 in a superimposed position to column 11 and connected by means of conduits 26 and 27. The upper portion of this small, methanol-column 24 is provided with a vapor off-take column 28 which leads to one or more condensers 29 and 31. A suitable reflux line is provided at 32 and a product withdrawal conduit provided at 33.

Referring to Fig. 2, there is shown in some detail, apparatus arrangement which may be employed for efficiently contacting the solvent or extractant for the soluble tars, oils and waxes, with the settled pyroligneous liquor. This set-up comprises a plurality of extraction columns 41, 42 and 43. For example, these columns might be 10 or 12 feet in diameter to 25–35 or more feet in length. Conduits 44, 46 and 47 are provided for the introduction of solvent to one end of the column and conduit 48 is provided for the introduction of the aqueous acetic acid solution to be treated. The columns are interconnected by means of conduits 49 and 51. Suitable draw-off conduits are provided at 52, 53 and 54 which empty, by means of conduit 56, into the still 57. The still 57 is provided with vapor off-take conduit 58 leading to a suitable condenser 59, thereby providing for the return of the recovered extractant to the system. A suitable conduit 61 is provided for withdrawing the removed tars.

A detailed understanding of my process will be had from the following example which is set forth for the purposes of illustrating my preferred embodiment. Hence it is to be understood that my invention is not exactly limited thereto.

Referring to Fig. 1, pyroligneous liquor which has been settled in a conventional manner to eliminate the visible tars and other solid constituents, is fed into the raw pyroligneous liquor reservoir 2. This liquor is passed through conduit 3 into exchanger 4 and in its passage is mixed with a suitable solvent for the soluble tars, oils and waxes fed through conduit 6 from the reservoir 7. A detailed description of several suitable solvents will be set forth hereinafter.

The raw liquor containing the detrimental soluble tars, oils and waxes but now in the presence of an extractant therefor, becomes heated in exchanger 4 by the hot acetic acid liquor withdrawn through conduit 16 and pumped into the exchanger at 17. This hot mixture of raw liquor which has been extracted with a tar solvent and thereby freed of such detrimental impurities, passes through conduit 8 into column 11 and flows down the column through conduit 14 into the calandria 12. At least a part of the liquor is vaporized through conduit 13 to furnish heat for the operation of columns 11 and 24 and this heating assists in the dealcoholization of the raw liquor being fed into the column at point 9.

The alcohol vapors pass through conduit 26 into column 24 and are there rectified from any pyroligneous liquor which may be present, methanol vapors passing through conduit 28 to the condensers 29 and 31, a portion of the methanol being returned as reflux through conduit 32 and another portion being withdrawn through 33.

Referring again to the exchanger 4, the cooled liquor is withdrawn from the exchanger through conduit 19 to a settling tank 21 or any suitable equipment which will allow the aforementioned oil extractant to be withdrawn through one conduit as at 23 and the tar-free, oil-free, wax-free acetic acid to be withdrawn at 22. The extractant may be processed and returned to supply tank 7 for re-use in the process. The purified aqueous acetic acid being withdrawn through 22 may be dehydrated by extraction, azeotropic distillation or a combination of such procedure to obtain a partially or completely dehydrated acid as may be desired.

Referring to Fig. 2 wherein further detailed procedure for treating the impure pyroligneous liquor is described, the operation of this set-up is more or less apparent from the legends appearing on the drawing. The impure raw pyroligneous liquor, comparable to that in container 2 of Fig. 1, is fed into the system of Fig. 2 through conduit 48. Likewise, a suitable extractant as in container 7 of Fig. 1, is fed into the system of Fig. 2 through conduits 44, 46 and 47. From the arrangement shown countercurrent extraction and some settling takes place in the series of units 41, 42 and 43 and the resultant tar, oil, wax-free acetic acid is withdrawn from the unit 43 as at 45 to dehydration treatment, as described. The spent extractant is withdrawn through conduit 56 to the still 57 where the extractant is distilled away from the tars, oils and waxes which have been eliminated from the raw pyroligneous liquor and the regenerated extractant returned through condenser 59 to the process.

The materials suitable as extractants for removing the aforementioned soluble tars, oils and waxes, are for example wood oils of the following characteristics, recovered from processing of the insoluble and soluble tars, oils and waxes. These oils which are substantially insoluble in the aqueous solution have boiling points from about 140° C. to 285° C. and a specific gravity of about .9 to 1.07 at 15.5° C.

*Examples*

*Light acid oil.*—An oil that is recovered by decantation from distilled pyroligneous acid and with a specific gravity less than 1.0. These various boiling ranges are suitable:

Up to 180° C.—specific gravity, 0.91 at 15.5° C.
180 to 220° C.—specific gravity, 0.95 at 15.5° C.
160 to 210° C.—specific gravity, 0.94–0.96 at 15.5° C.
220 to 254° C.—specific gravity, 1.015 plus or minus at 15.5° C.
245 to coke—specific gravity, 1.03 plus or minus at 15.5° C.

*Wood oil (creosote oil).*—An oil from the processing of the insoluble settled tar and soluble tar.
190 to 254° C.—specific gravity, 1.021 at 15.5° C.
190 to 210° C.—specific gravity, 0.98 at 15.5° C.
185 to 261° C.—specific gravity, 1.05 plus or minus at 15.5° C.

*Mixture of coal tar and wood oils*

A fraction 85° C. to 210° C.—specific gravity, 0.92 at 15.5° C.

*Esters.*—The esters of the lower fatty acids are also efficient extractors for the dissolved tars, oils and waxes, but they are not as useful, as they are partly soluble in the aqueous solution.

*Alcohols.*—The alcohols containing 10 or more carbon atoms such as fenchenol, borneol, alpha terpineol, which are a product of the Naval Stores Industries.

In addition, various mixtures and certain esters may be employed.

In the operation of my process I generally employ the extractant in various proportions up to about 50% of the volume of the raw pyroligneous liquor being treated, due regard being had to the quantity of tars, oils and waxes that are present in the liquor and which it is desired to remove. As indicated, the raw liquor is intimately mixed with the extractant preferably in accordance with the procedure of Fig. 1, where there is some heating.

With further reference to Fig. 2, as indicated, I pass the extractant through the vertical columns countercurrent to the aqueous raw pyroligneous liquor. The velocity of the aqueous feed may vary from, for example, .015 feet per second to and including .077 feet per second. The ratio of the aqueous solution to the extractant may vary from 1:1 to 20:1 inclusive. I have found that a travel of 60 feet for the lower velocity with a corresponding increase in length for the higher velocity, gives excellent extraction. As indicated above, the extractant preferred is a selective fraction boiling between 185–261° C. with a specific gravity of 1.05 at 15.5° C.

In accordance with my preferred embodiment of Fig. 1, I prefer to extract and dealcoholize simultaneously in the same equipment, thereby reducing handling and equipment costs and improving the yield. The settled tars aforementioned, as well as possibly the other tars, waxes and oils eliminated from the pyroligneous liquor may contain small amounts of entrapped acetic acid. While such acetic acid may be eliminated by using coil or open steam, because of the large volume of materials to be treated, a rather large heat input is required. I have found that this acetic acid, which otherwise might be lost, may readily be recovered by water extraction and the resultant aqueous solution of acetic acid incorporated with the raw pyroligneous liquor or with the acid going to acid concentration in accordance with either Fig. 1 or Fig. 2 of the attached drawing.

As indicated above, the aqueous acetic acid drawn off through conduit 22 of Fig. 1 or through conduit 45 of Fig. 2, may be fed to some suitable dehydration process such as shown, for example, in Gordon Patents 2,049,440 and 2,049,441, Gordon and Conklin 2,129,684 and Othmer Patents 2,028,800 and 2,050,234.

However, in accordance with my preferred procedure the settled pyroligneous liquor would be treated in accordance with the process of Fig. 1, which includes heating to eliminate the soluble tars, oils and waxes, as well as to simultaneously dealcoholize. The treated aqueous pyroligneous liquor drawn off through conduit 22 would then be extracted with a mixture of lower aliphatic esters such as methyl acetate, ethyl acetate, propyl acetate and the like to obtain a hydrous extract. Such an extract is one which, upon distillation thereof, yields aqueous acetic acid. This hydrous acetic acid so obtained I prefer to subject to azeotropic distillation with a halogenated hydrocarbon such as ethylene chloride, propylene chloride and the like to obtain a substantially anhydrous acid. I have found that by such procedure a very clear and high-grade acetic acid may be obtained.

The further procedure for rendering my process more economical is apparent from the following example:

I have found that tars containing 6½% acetic acid, when passed downward through 50–70 foot column of water ascending (or vice versa, according to sp. gr. of tar) the water ratio being, in this example, 1 water to 1 of tar (the ratio can be varied to meet the economic balance as to amount acid remaining in tar), the water removed all the acid except .3% left in tar.

My process results in considerable saving in that the extraction procedure described efficiently removes the dissolved or soluble tars, oils and waxes, thereby producing a relatively clear aqueous acetic acid solution from which the methanol can be readily removed and which lends itself to further extraction and/or steam distillation of the hard and soft woods. It is apparent from the foregoing that my invention is susceptible of some modification; hence, I do not wish to be restricted, excepting insofar as is necessitated by the prior art and the spirit of the appended claims.

What I claim and desire to be secured by Letters Patent of the United States is:

1. A process for producing relatively pure and clear acetic acid from crude pyroligneous liquor containing tars, oils and waxes, which comprises settling said liquor to eliminate visible tars, oils and waxes, and obtaining raw pyroligneous liquor containing soluble tars, oils and waxes, feeding said settled pyroligneous liquor in intimate contact with a tar solvent, heating said mixture of liquor and tar solvent, feeding the resultant pyroligneous liquor to the upper portion of a distillation column, distilling off methanol, withdrawing the de-methanolized acetic acid in heated condition from the column, passing it in heat transfer relationship with the aforementioned mixture of liquor and solvent to obtain at least a part of said heating and thereby cooling said acetic acid, further settling said cooled acetic acid and subjecting the supernatant settled acetic acid to dehydration treatment, and recovering solvent from said settling treatment and returning it to the process.

2. A process for treating pyroligneous liquor containing undesired constituents such as dissolved tars, oils and waxes and methanol, which comprises subjecting said pyroligneous liquor to hot extraction treatment for removing said tars, oils, and waxes and substantially simultaneously dealcoholizing the extracted pyroligneous liquor by distillation, the heated dealcoholized pyroligneous liquor from said distillation being returned to the step of removing the tars, oils and waxes for furnishing heat to said hot extraction.

3. A process for producing a clear tar-free acetic acid from pyroligneous liquor, which comprises settling crude pyroligneous liquor to eliminate visible tars, oils and waxes, feeding said settled pyroligneous liquor into intimate contact with tar solvent for removing soluble tars, oils and waxes, heating said mixture of liquor and tar solvent and subjecting the liquor to a distillation treatment for eliminating methanol, passing the hot demethanolized aqueous acetic acid in heat transfer relationship to obtain at least a part of the aforementioned heating, and thereby cooling said aqueous acetic acid, withdrawing a cooled tar, oil and wax-free aqueous acetic acid, extracting said aqueous acetic acid with a mixture of lower aliphatic esters, distilling the extract and thereafter subjecting the hydrous acetic acid resulting from the aforementioned distillation to azeotropic distillation in the presence of a halogenated hydrocarbon.

4. A process in accordance with claim 1 wherein the settled components are water extracted for recovering acetic acid entrapped therein and said recovered acetic acid returned to the process.

5. A process for treating pyroligneous liquor to obtain a relatively clear acetic acid therefrom, which comprises obtaining a settled pyroligneous liquor having a content of undesired soluble tars, oils and waxes, hot extracting said mixture with a solvent for the undesired constituents, subjecting the extracted pyroligneous liquor to distillation for volatilizing methyl alcohol, further rectifying said methyl alcohol vapors, withdrawing a proportion of the rectified methyl alcohol and returning a portion to the rectification for reflux, withdrawing from the distillation at least a part of the dealcoholized pyroligneous liquor in a heated condition and recovering at least a part of said heat therein by using at least a part of the heat from said heated liquor in the aforesaid hot extracting step.

BERNARD K. BRIGHT.